Sept. 13, 1955  P. H. PELLEY  2,717,792
SEAL FOR AIRCRAFT CONTROL MEMBER
Filed Jan. 30, 1952
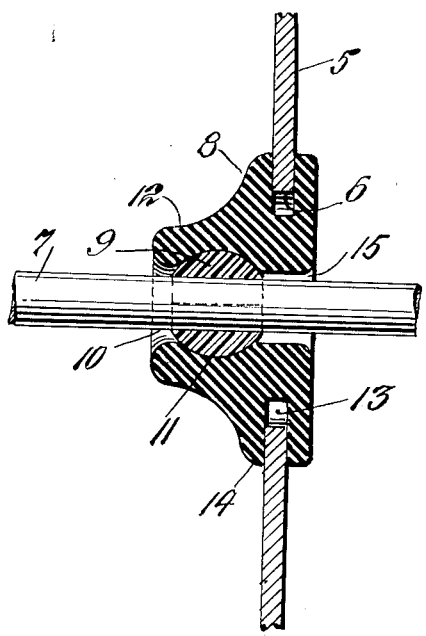
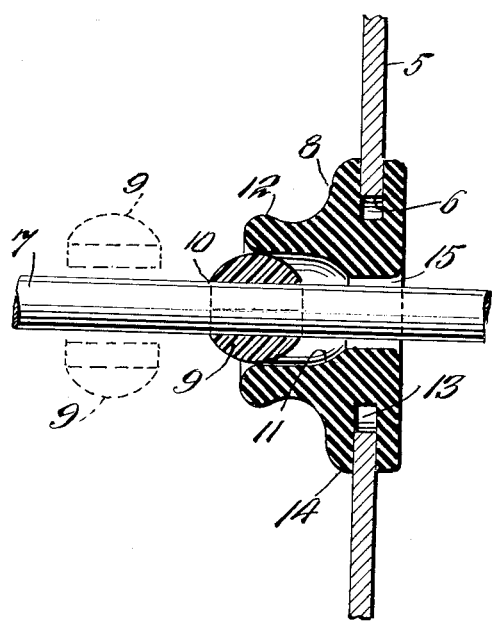
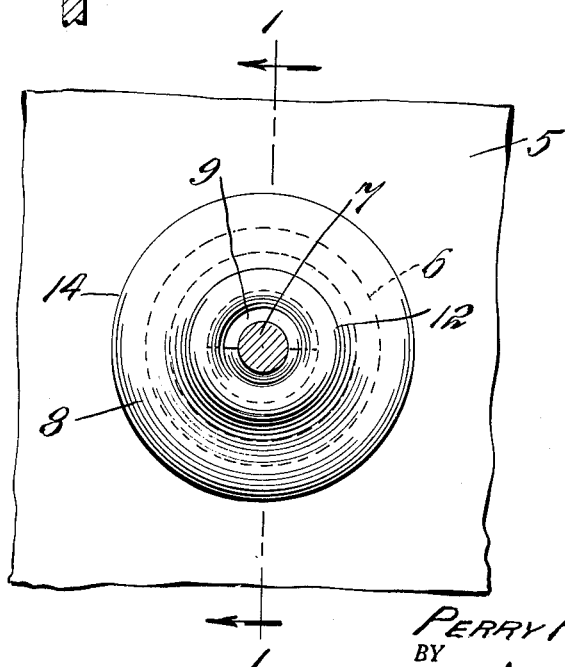
INVENTOR.
PERRY H. PELLEY
BY
Philip S. McLean
ATTORNEY

United States Patent Office 2,717,792
Patented Sept. 13, 1955

2,717,792
SEAL FOR AIRCRAFT CONTROL MEMBER

Perry H. Pelley, Wichita, Kans., assignor to Beech Aircraft Corporation, Wichita, Kans., a corporation of Delaware Application January 30, 1952, Serial No. 268,971

1 Claim. (Cl. 288—2)

The invention here disclosed relates to aircraft controls such as cables, rods and tubes which operate through the bulkheads of pressurized compartments, and the primary objects of the invention are to provide a seal for such controls which will operate with a minimum of friction and a minimum of leakage.

Practical objects of the invention are to provide a structure of this character which will consist of a minimum of parts and which can be quickly and easily installed or removed.

Further special objects of the invention are to provide a seal of the character indicated which will be self-adjusting for alignment, angular, rotary and sliding movements, to suit the action of the control, and all without imposing frictional load on the cable or other control element and without losing any sealing effectiveness.

Further special objects of the invention are to provide a cable seal, as indicated, which will utilize the pressure of a pressurized compartment to maintain the effectiveness of the seal, which will be small and compact so as not to take up too much room or be in the way of other objects and which with all its advantages will be of low cost.

Other desirable objects attained by the invention are set forth and will appear in the course of the following specification.

The drawing accompanying and forming part of the specification illustrates a present practical embodiment of the invention. Structure, however, may be modified and changed as regards the immediate illustration, all within the true intent and scope of the invention as hereinafter defined and claimed.

Fig. 1 in the drawing is a cross sectional view of the device as taken on substantially the plane of line 1—1 of Fig. 3, with the bulkhead wall and the control element passing through it shown in broken lines and in section;

Fig. 2 is a similar view showing parts in the act of assembly and showing further, in broken lines, the guide ball made in hemispherical sections, enabling it to be applied at any place over a cable or other control element;

Fig. 3 is a face view of the seal in place on the bulkhead, the latter broken away and the control element appearing in section.

In the several views a bulkhead wall is indicated at 5, having an oversize opening 6 therethrough for passage of a cable or other such control element or connection 7.

The seal comprises but two basic elements, a grommet 8 seated in the bulkhead opening, and a ball 9 swiveled in the grommet and having a passage 10 for close fitting but free sliding movement of the cable therethrough.

The grommet is made of rubber or other suitable elastomeric material, molded or otherwise formed with a close fitting spherical socket 11 for the ball, and the ball is preferably made of "nylon" or other such material having a low coefficient of friction, enabling it to smoothly guide the cable, rod or other control connection, in free sliding and possibly rotary movements, and further enabling the ball to swivel freely in the confining socket in the grommet.

The elasticity of the grommet permits this socket to be opened or spread as shown in Fig. 2, for admission or removal of the guide ball, and this view further shows, in dotted lines, how the ball may be made in two hemispherical sections which can be placed over opposite sides of the control.

Easy assembly and disassembly is further aided by constructing the grommet as shown in Figs. 1 and 2, in generally conical form with a tapered neck or nipple formation 12, containing the ball socket and located wholly to the pressure side of the bulkhead wall so that pressure in the compartment will have the effect or tendency to hold the tapered neck containing the socket closed over the ball rotatably seated therein.

The grommet is shown as mounted in the bulkhead wall by having a relatively deep annular groove 13 about the base portion of the same, of a width approximating the thickness of the bulkhead and of an inside diameter less than that of the opening 6 in the wall so as to permit lateral adjustments for necessary alignment of the control connection.

This construction also takes advantage of the pressure in the compartment to hold the front flange 14 provided by the groove, in close sealing engagement with the face of the bulkhead.

The opening 15 through the base of the grommet, coextensive with the back of the spherical socket 11, is large enough to permit any usual angular adjustments of the control connection.

The invention thus provides a guide and seal for the sliding cable or other control and which is self-aligning, through lateral adjustments of the grommet on the bulkhead and which is angularly and rotatably adjustable through free swivelling movements of the guide ball in the spherical socket in the grommet.

The tapered formation of the flexible and resilient neck projecting at one side from the otherwise flat mounting base portion of the grommet facilitates necessary collapsing movement of the elastomeric grommet to get it in the bulkhead opening, as well as facilitating engagement of the guide ball in the socket after the grommet has been mounted in the wall.

The guide ball being of a low frictional coefficient material, permits the cable or other control to slide or turn, or both slide and turn freely therein, and this same characteristic permits the ball to rock freely in the grommet to allow for angularity of the control.

The device can be small since it consists of but two main parts, the guide ball and the mounting grommet, and these not much larger than the control which it guides and seals.

The control operates through the ball with a minimum of friction and with a minimum of leakage, and with the pressure in the compartment aiding in sealing the ball in the grommet and the grommet in the bulkhead.

The structure is simple in design and can be produced at low cost.

The guide ball, when made in halves or sections as indicated, may be engaged about the cable at any convenient point, after the cable has been passed through the grommet and the parts otherwise are ready for final assembly.

If necessary or desirable, the grommet may be removed from the bulkhead, without taking out the control, after first removing the ball to permit collapsing of the flanged base of the grommet.

The grommet may be split at one side or be made in halves or segments to permit mounting and unmounting in respect to the bulkhead, without disturbing the control connections extending through the bulkhead.

What is claimed is:

A self-aligning, angularly and rotatably adjustable guide and seal for an aircraft control member, comprising a one-piece grommet of elastomeric material having an annularly grooved base portion to slidingly fit into an oversize opening in a bulkhead wall and a tapered conical neck portion projecting from said base portion, said grommet having an opening for the control member extending centrally through said projecting tapered neck portion and base portion, a spherical ball socket enlargement in the intermediate portion of said opening within said projecting tapered neck portion thereby reducing the wall thickness of said tapered projecting neck portion and increasing the resiliency of the grommet sufficiently for entry of the grooved base portion into sliding engagement in an opening in a bulkhead wall, and a guide ball having a close fitting but swiveling engagement in said ball socket, said ball having a passage therethrough for a control member and being of a hard, smooth surface material having a low coefficient of friction, said reduced wall thickness portion of the tapered projecting neck portion being readily expandable to admit the ball and contractable to close over and hold the ball in swiveling engagement in the ball socket.

References Cited in the file of this patent

UNITED STATES PATENTS

| | | |
|---|---|---|
| 1,983,368 | Hathorn | Dec. 4, 1934 |
| 2,381,391 | Brown | Aug. 7, 1945 |
| 2,404,539 | Schmidt | July 23, 1946 |
| 2,517,693 | Mead et al. | Aug. 8, 1950 |
| 2,592,130 | Erb et al. | Apr. 8, 1952 |